Patented July 26, 1932

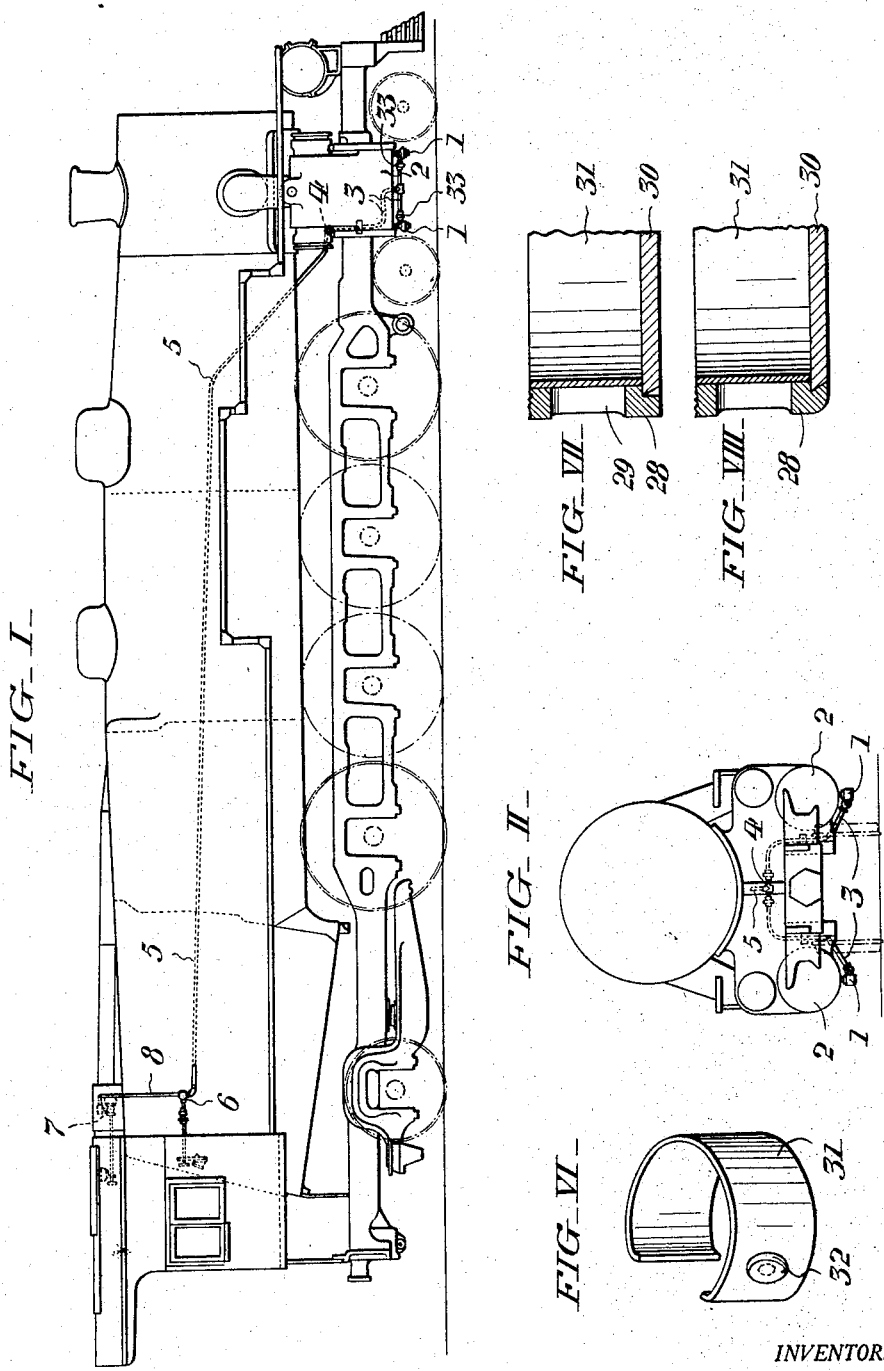

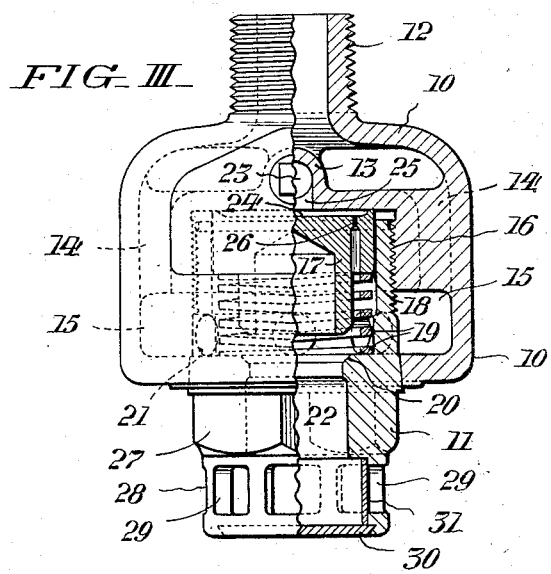
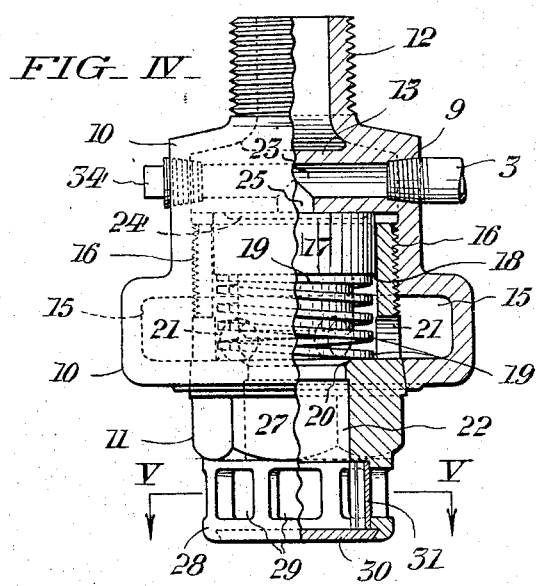
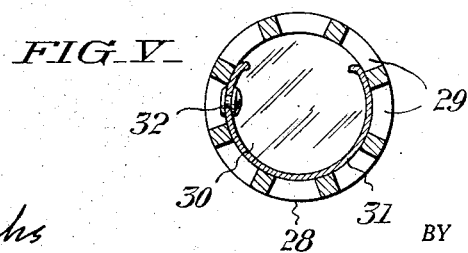

1,868,635

UNITED STATES PATENT OFFICE

HARRY A. HOKE, OF ALTOONA, PENNSYLVANIA

CYLINDER COCK AND THE LIKE

Application filed January 8, 1931. Serial No. 507,346.

This invention, while relating generally to cocks or valves, is especially useful in its application to automatic cocks used for relieving excessive pressures in the cylinders of locomotives. Such cocks are customarily located beneath the locomotive cylinders and at each end thereof, and it is particularly important that the discharge of steam or hot water from the cylinder cocks be directed towards the rear of the locomotive. The cocks are so directed to prevent steam from being discharged ahead, or onto station platforms, or in a direction downward or transverse to the locomotive, which would result in dirt being thrown into the axle bearings. The valve body of an automatic cylinder cock is customarily made with a threaded extension which fits in a correspondingly threaded opening in the bottom of the locomotive cylinder. If the cock is screwed tightly into the cylinder, the passage through which steam is vented to the atmosphere may be found to be directed at a considerable angle from the desired direction. On the other hand, if the cock is not screwed tightly into the cylinder in order that the discharge passage may be directed to the rear, the threaded connection will not be sufficiently tight, and the vibration of the locomotive will cause the threads to wear rapidly with the result that leaks will appear and replacement of the cylinder cock will be necessary.

Accordingly, the object of the present invention is to provide a cylinder cock or like article with a revolvable deflector adjacent to the discharge passage, which deflector, when the valve body has been screwed tightly into the pressure chamber to which it is applied, may be moved to a position such that the discharge from the cock will issue in the desired direction.

A further object of the invention is to provide such a deflector with means for causing it to catch yieldingly in different positions in the discharge passage, so that, once set in the desired position, the deflector will not be dislodged incident to the operation of the cock or the vibration of the cylinder, though the deflector may be readily turned with the aid of proper tools.

Other objects and advantages characterizing my invention will be more fully apparent from the description of one embodiment or example thereof which follows hereinafter, and which has reference to the accompanying drawings.

Of the drawings:

Fig. I represents diagrammatically a side elevation of a locomotive showing the position of the cylinder cocks thereon, and the various pipe connections associated with the cocks.

Fig. II represents a front view of the same with certain parts removed to show the pipe lines leading to the cylinder cocks.

Fig. III represents a side elevation partly in section, of a cylinder cock embodying the deflector of my invention.

Fig. IV represents an elevation of the same, taken at right angles to the elevation shown in Fig. III.

Fig. V represents a cross-section, taken as indicated by the lines V—V of Fig. IV.

Fig. VI represents a perspective view of the deflector.

Fig. VII represents an enlarged cross-section of the bottom of the cylinder cock before the bottom plate is inserted therein by beading; and, Fig. VIII represents a similar view of the bottom of the cylinder cock after the bottom plate has been affixed thereto by beading.

With particular reference to Fig. I, the cylinder cocks are indicated at 1 and are located beneath each cylinder 2, there being one cock at each end of a cylinder. Pipes 3 from the cylinder cocks at each side of the locomotive join at 4 with a pipe 5 which leads rearward to a valve 6 located in the front of the cab. Steam is supplied from a bridgepipe casting 7 at the top of the cab through a pipe 8 and valve 6 to pipe 5. When the locomotive is standing, valve 6 is closed, so that there is no pressure in pipes 3 and 5.

With reference to Figs. III and IV, it will be noted that each branch of pipes 3 referred to above is connected to a cylinder cock at a threaded pipe tap 9. Each cylinder cock comprises generally a valve body having an upper part or casting 10 and a lower part 11. The upper part 10 of the valve body is provided with a threaded extension 12 adapted to fit within a correspondingly threaded opening in the bottom of a cylinder 2. Steam from the cylinder passes through the threaded extension 12 and around a cylindrical web portion 13 of the casting 10, to which pipe 3 is connected, and through passages 14 to a chamber 15 surrounding the lower part 11 of the valve body. The lower part 11 of the valve body includes a threaded bushing 16 screwed tightly into the casting 10. Housed within the bushing 16 there is a valve 17 having a shoulder 18 bearing upon a spring 19 which tends to keep the valve off the seat 20.

When the valve 17 is off the seat 20, steam passes from the chamber 15 through openings 21 in the part 11 to the discharge passage 22. When, however, the pressure in the passage 23 within the cylindrical web portion 13 of the casting 10 exceeds that within the chamber 15, this pressure acting upon the face 24 of valve 17 forces the valve down upon the seat 20. When the valve 6 at the front of the locomotive is closed, as when the locomotive is standing idle, there is no pressure in pipe 3 or in passage 23, and consequently the spring 19 maintains valve 17 off the seat 20 in the position shown in the drawings. In this position, steam from the pressure chamber or cylinder to which the cock is attached is free to pass from chamber 15 to passage 22 and thence to the atmosphere. To close the cylinder cock the engineman opens valve 6 which admits boiler pressure to the cylinder cock through pipe 3 and the opening 25 within the cylindrical web portion 13 to the face 24 of valve 17, overcoming the pressure of the spring 19 and forcing the valve 17 onto the seat 20, which prevents the further discharge of steam from chamber 15 to the passage 22. If for any reason the pressure in the end of the cylinder should exceed boiler pressure, as might happen when water is trapped in the cylinder, the pressure acting on shoulder 18 of valve 17 will lift the valve off its seat 20 and allow the excess pressure to escape to the atmosphere. After the excess pressure has been released, the valve will again seat and function as before. The valve 17 is provided with a small opening 26 which serves as a drain port so that any water collecting in the pipes leading to the face 24 of valve 17 may be discharged from the system.

As thus far described, the cock 1 is similar both with respect to form and operation to automatic cylinder cocks now in general use. With the older forms of cocks, however, the bottom of the lower part 11 of the valve body was customarily formed with the direction of the discharge from passage 22 fixed at right angles from pipe connection 3. In my improved cock, I form the lower part 11 with a nut portion 27 which merges with a subjacent integral annular projection 28. The nut portion 27 enables the threaded bushing 16 to be screwed tightly into the casing 10. The annular projection 28 is slotted throughout to form a series of openings 29 around its circumference, and is provided with a flat plate 30, preferably inserted by beading, to close the passage 22 at the bottom of the cock. The form of the bottom of the projection 28 before beading is shown in Fig. VII. The form of the same part after the beading operation is shown in Fig. VIII.

Within the annular projection 28, there is a deflector 31 in the form of a flat spring bent to circular shape as shown clearly in Fig. VI. The deflector is provided with a stop 32 which may constitute a rivet or other form of projection. By revolving the deflector 31 within the annular member 28, the direction of the discharge from passage 22 to the atmosphere is controlled. Furthermore, the deflector is of such resilience that the rivet 32 is adapted to catch yieldingly in one slot 29 or another. For example, the deflector, while retained against dislodgement incident to vibration of the locomotive, by virtue of the stop 32 interlocking with a slot 29, will yield when a screw-driver or other suitable tool is applied and may be revolved to any desired position.

Accordingly, when a cock of my invention is inserted within a locomotive cylinder or other form of pressure chamber, the valve body may be screwed tightly into the cylinder or chamber, and the lower part of the valve body may be screwed tightly into the upper part of the valve body. Irrespective of the resulting fixed position of the bottom of the valve body with respect to the cylinder or chamber, the direction of the discharge may be controlled by the simple operation of turning the deflector within its annular housing.

By providing a joint at 33 in the pipe 3 and by selecting the particular end of the cylindrical web portion 13, which, when the cock is screwed home, happens to be nearest the joint 33 for connection to pipe 3, and inserting a plug 34 in the opposite end, the cock may be readily applied to a locomotive cylinder without the necessity of exercising great care in manufacture in the starting of the threads of the extension 12 or the opening within which it fits. The annular housing being formed, separately from the nut portion of the deflector, there is no danger of the parts being damaged when the lower part 11 of the valve body is screwed into the upper part 12. Furthermore, the size of the cock as compared with the older form is not increased to the extent that the bottom portion comes too close to the rails.

When a cylinder cock of this invention is initially applied to a locomotive it is screwed into the cylinder to the point where a steam tight engagement is effected at the threaded extension 12. Thereupon the connecting pipe 3 is bent and fitted to the nearest pipe tap 9, which can be readily accomplished with pipes of the size and flexibility customarily used for this purpose. When the cylinder cock has been thus assembled, the deflector 31 is revolved to a position in which the discharge will be directed as desired. If it becomes necessary to remove the cylinder cock, the wear which takes place on the threads and which may permit the cylinder cock upon subsequent replacement to be screwed further into the cylinder will not cause any difficulty such as has been experienced with other forms of cylinder cocks, for by adjustment of the deflector 31 the discharge may be maintained in the desired direction.

While I have described one form which this invention may take, it will be apparent that various changes may be made in the example or embodiment of the invention herein selected for illustration and description without departing from the spirit of the invention as defined in the annexed claims.

Having thus described my invention, I claim:

1. In a cylinder cock or the like, a valve body having an extension thereon adapted to fit in a fixed position within a pressure chamber and having a projection defining a discharge passage with outlets to the atmosphere, a revolvable deflector at said outlets, and interlocking means on said deflector and said projection whereby said deflector is adapted to catch yieldingly in different positions at said outlets to control the direction of the discharge.

2. In a cylinder cock or the like, a valve body having an extension thereon adapted to fit in a fixed position within a pressure chamber and having a slotted annular projection forming a discharge passage to the atmosphere, and a revolvable deflector on said projection, and means on said deflector adapted to catch yieldingly in different slots of said annular projection to control the direction of the discharge.

3. In a cylinder cock or the like, a valve body having an extension thereon adapted to fit in a fixed position within a pressure chamber and having a slotted annular projection forming a discharge passage to the atmosphere, a deflector in the form of a flat spring bent to circular shape adapted to revolve on said projection, and means on said deflector adapted to catch yieldingly in different positions in the slots of said annular projection to control the direction of the discharge.

4. In a cylinder cock or the like, a valve body having an extension thereon adapted to fit in a fixed position within a pressure chamber and having a slotted annular projection forming a discharge passage to the atmosphere, a deflector in the form of a flat spring bent to circular shape and adapted to revolve on said projection, and a stop on said deflector adapted to catch in the slots in said annular projection whereby the direction of the discharge from said valve body may be controlled by moving said deflector with the stop catching in different slots in said annular projection.

5. In a locomotive cylinder cock, a valve body having an extension thereon adapted to fit in a fixed position within a pressure chamber, a bushing within said valve body having an integral projection defining a discharge passage, said projection being closed at its end and provided with wall openings leading horizontally to the atmosphere, a revolvable deflector at said wall openings, and means on said deflector adapted to catch yieldingly in said wall openings to control the direction of the discharge.

In testimony whereof, I have hereunto signed my name at Altoona, Pennsylvania, this 6th day of January, 1931.

HARRY A. HOKE.